United States Patent
Vincent et al.

(10) Patent No.: US 10,673,581 B2
(45) Date of Patent: Jun. 2, 2020

(54) LOW LATENCY PACKET RECOVERY

(71) Applicant: Enyx SA, Paris (FR)

(72) Inventors: Brice Vincent, Paris (FR); Christophe Desmouliers, Le-Plessis-Robinson (FR)

(73) Assignee: ENYX SA, Paris (FR)

( * ) Notice: Subject to any disclaimer, the term of this patent is extended or adjusted under 35 U.S.C. 154(b) by 0 days.

(21) Appl. No.: 15/366,699

(22) Filed: Dec. 1, 2016

(65) Prior Publication Data

US 2017/0294991 A1 Oct. 12, 2017

Related U.S. Application Data

(60) Provisional application No. 62/320,885, filed on Apr. 11, 2016.

(51) Int. Cl.
*H04L 1/22* (2006.01)
*H04L 1/00* (2006.01)
*G06F 11/07* (2006.01)
*H04L 9/32* (2006.01)

(52) U.S. Cl.
CPC ........... *H04L 1/22* (2013.01); *G06F 11/0709* (2013.01); *G06F 11/079* (2013.01); *H04L 1/0061* (2013.01); *H04L 9/3242* (2013.01)

(58) Field of Classification Search
CPC ....... H04L 1/22; H04L 1/0061; H04L 9/3242; G06F 11/0709; G06F 11/079
See application file for complete search history.

(56) References Cited

U.S. PATENT DOCUMENTS

| | | | | |
|---|---|---|---|---|
| 6,891,801 | B1* | 5/2005 | Herzog | H04L 12/40189 370/237 |
| 2002/0128822 | A1* | 9/2002 | Kahn | G10L 21/01 704/200.1 |
| 2005/0125692 | A1* | 6/2005 | Cox | H04L 63/0236 726/4 |
| 2006/0013210 | A1* | 1/2006 | Bordogna | H04L 45/00 370/389 |
| 2009/0201805 | A1* | 8/2009 | Begen | H04L 1/0009 370/225 |
| 2009/0220073 | A1* | 9/2009 | Verghese | H03M 7/30 380/29 |
| 2009/0307288 | A1* | 12/2009 | Kitaguchi | H04L 12/56 |
| 2011/0182294 | A1* | 7/2011 | Lee | H04L 47/34 370/394 |
| 2014/0006247 | A1* | 1/2014 | Chai | G06Q 40/04 705/37 |
| 2014/0185432 | A1* | 7/2014 | Liu | H04L 41/0668 370/228 |
| 2014/0280752 | A1* | 9/2014 | Seastrom | H04L 67/1002 709/219 |

(Continued)

*Primary Examiner* — Alex Skripnikov
*Assistant Examiner* — Sharmin Chowdhury
(74) *Attorney, Agent, or Firm* — Baker & Hostetler

(57) ABSTRACT

Methods, systems, and computer program products are provided for receiving a data packet at a receiver in a communication system, the communication system comprises at least one main transmission network and at least one backup network, the detection of the loss of a data packet from a main transmission network being based on a hash key signature derived from at least a portion of the data packet and the lost data packet being recovered from a backup network.

40 Claims, 6 Drawing Sheets

(56) References Cited

U.S. PATENT DOCUMENTS

2015/0139636 A1* 5/2015 Wisehart ............... H04L 45/24
                                                    398/5
2016/0149820 A1* 5/2016 McGhee ............... H04L 47/32
                                                    370/230
2016/0292179 A1* 10/2016 von Muhlen ..... G06F 17/30174

* cited by examiner

LOW LATENCY PACKET RECOVERY

CROSS-REFERENCE TO RELATED APPLICATIONS

This application claims priority to U.S. provisional patent application No. 62/320,885, filed on Apr. 11, 2016, the disclosure of which is incorporated by reference in its entirety.

FIELD OF INVENTION

The invention generally relates to communication systems, and more particularly to a low latency method and a system for recovering packets from a non-reliable network.

BACKGROUND

In certain application fields, such as financial computing systems, very low latency data exchange channels are critical. Indeed, Radio Frequency (RF) networks provide lower latency compared to wired networks. However, the RF networks' reliability is subject to weather conditions, and signal reflection over water paths. As a result, they can quickly become unusable if no recover system is in place.

There exist different solutions to ensure that no packet is lost during a communication through data exchange channels. Such solutions comprise either standard solutions using a handshake type protocol or custom solutions using some sort of packet identification tags.

In particular, one existing solution is based on the Transmission Control Protocol (TCP). TCP is used for reliable communications where it is required to have a limited loss of packets or even, in some cases, no loss of packets at all. Such protocol is part of the Internet protocol suite and it provides a reliable, ordered and error-checked communication channel between applications over an IP network. The TCP keeps track of each packet and in case of packet loss or corruption, a retransmission is initiated. However, such TCP based solution is not suitable for very low latency data exchange as each retransmission add extra latency roughly equal to twice the latency of the communication channel. Moreover it cannot be used on a RF network whose reliability depends on weather conditions causing a lot of retransmission, thereby resulting in increased latency.

Another conventional solution is based on the use of a backup network along with a Frame Sequence Number (FSN). The backup reliable network can be used to recover lost or corrupted packets from, in order to reduce latency due to retransmission. A FSN is added to the packets and forwarded to both RF and Backup networks. This FSN is used to determine if packets have been lost on the RF network in order to be recovered from the backup network. The system queues the packets from the RF network until all lost packets have been recovered. This guarantees that the transmission order is kept. However, although such solution allows achieving lower latencies than TCP, keeping the sequence order often becomes very penalizing. Moreover, adding extra information to the packet going to the RF network results in an increase of the serialization delay (i.e. time to send the packet through the RF interface) hence the latency. Usually, such RF networks have a bandwidth of 100 Mbps which gives a serialization delay of 80 ns per Byte.

Further, using only a FSN to detect packet loss is risky if the RF network is very noisy. Indeed, if the number of consecutive frame lost is more than the maximum FSN then the recovery process can be completely out of synchronization. For example, if the FSN is coded on 8 bits, the maximum number of consecutive frame lost may be less than 256. Otherwise the FSN value might rollover so that it will not be possible to determine how many packets were lost.

Thus, improved systems, methods, and computer program products are needed for low latency packet recovery.

SUMMARY OF THE INVENTION

In order to address these and other problems, there is provided a method of receiving a data packet at a receiver in a communication system, the communication system comprising at least one main transmission network and at least one backup network, the method comprising detecting loss of a data packet from a main transmission network based on a hash key signature derived from at least a portion of the data packet and recovering the lost data packet from a backup network.

In an embodiment, each data packet received through the at least one backup network may comprise a frame sequence number, and the method may further comprise detecting loss of a data packet from the backup transmission network using the frame sequence number.

In an embodiment, each data packet received through the at least one main network and at least one backup network may comprise a frame check sequence field, the method further comprising forwarding error free user data packets from the main transmission network or the backup transmission network to a destination user device using the frame check sequence field.

The hash key signature may be derived from one or more fields of the data packet that vary among the data packets.

In some embodiments, the data packet may be a data packet according to an Ethernet protocol, and the hash key signature may be derived from at least one field chosen in the group consisting of an Ethernet MAC address field, an Ethernet Ethertype field, the data payload and an Ethernet CRC field.

The hash key signature may be determined using at least one hashing algorithm chosen in the group consisting of a Message Digest 5 (MD5) algorithm or the Secure Hash Algorithm 1 (SHA-1).

In an embodiment, the method may comprise determining if a received data packet may be corrupted, the step of detecting loss of a data packet being performed if it is determined that the data packet is not corrupted.

The method may further comprise:
buffering a data packet if the data packet is not corrupted; and/or
dropping the data packet if the data packet is corrupted.

In one embodiment, each data packet received at the receiver may comprise a FCS field and the step of determining if the received data packet is corrupted may comprise computing the FCS of a received data packet and comparing the computed FCS with the FCS included in the FCS field of the data packet.

In some embodiments, the method may comprise filtering the received data packets according to filtering rules that depend on at least one field of the data packets, the step of detecting loss of a data packet only applying to the filtered data packets.

In particular, the step of detecting loss of a data packet may comprise:

in response to the reception of a data packet received from a main transmission network, computing a main hash key signature from at least one portion of the received data packet, in response to the reception of a data packet received from a backup transmission network, computing an auxiliary hash key signature from at least one portion of the received packet data, the method further comprising detecting loss of a data packet using the main hash key signature and the auxiliary hash key signature.

In an embodiment, the step of detecting loss of a data packet may comprise:

for each data packet received from a main transmission network, computing a hash key signature from at least one portion of the received data packet and storing the hash key signature into a main hash key memory, for each data packet received from a backup transmission network, computing a hash key signature from at least one portion of the received packet data and storing the hash key signature into a backup hash key memory together with the frame sequence number associated with the data packet, the method further comprising detecting loss of a data packet from the hash key signature stored in the main hash key memory, in response to the presence of at least one hash key signature stored in the backup hash key memory.

In an embodiment, the data packets received from a backup network may be buffered, and the step of detecting loss of a given data packet may comprise determining if the main hash key memory is empty, and if so forwarding the data packet corresponding to a target packet frame sequence number to a destination user device and updating the target packet frame sequence number.

In an embodiment, the method may comprise comparing the packet frame sequence number stored in association with the hash key signature in the backup hash key memory with the target packet frame sequence number, and if so updating the target packet frame number.

The method may further comprise dropping the data packet if the hash key signature in the backup hash key memory is equal to the hash key signature in the main hash key memory.

In an embodiment, the method may comprise sending the data packet to a destination user device if the hash key signature in the backup hash key memory differs from the hash key signature in the main hash key memory.

The communication system may comprise one main transmission network and at least two backup networks.

The communication system may comprise at least two main transmission networks and one backup network.

In an embodiment, the communication system may comprise one main transmission network and one backup network.

In an embodiment, the communication system may comprise at least two main transmission networks and at least two backup networks.

There is also provided a receiver for receiving a data packet in a communication system, the communication system comprising at least one main transmission network and at least one backup network, the receiver comprising a loss detection unit for detecting loss of a data packet from a main transmission network based on a hash key signature derived from at least a portion of the data packet and for recovering the lost data packet from a backup network.

There is further provided a communication system comprising at least one transmitter configured to transmit data packets through at least one main transmission network and/or at least one backup network, the communication system further comprising and at least one receiver for receiving data packets, the receiver being configured to recover lost packets from the main transmission network and forward the data packets to at least one destination user device. Such receiver comprises a loss detection unit for detecting loss of a data packet from a main transmission network based on a hash key signature derived from at least a portion of the data packet and for recovering the lost data packet from a backup network.

Embodiments of the inventions also provide a computer program product for receiving a data packet at a receiver in a communication system, the communication system comprising at least one main transmission network and at least one backup network, the computer program product comprising:

a non-transitory computer-readable storage medium; and program code stored on the non-transitory computer-readable storage medium that, when executed by one or more processors, causes the one or more processors to detect loss of a data packet from a main transmission network based on a hash key signature derived from at least a portion of the data packet and recovering the lost data packet from a backup network.

The method, receiver, communication system and computer program product according to the various embodiments of the invention provide a low latency solution enabling packet recovery using a main transmission network (e.g. RF network) along with a reliable backup transmission network (such as a fiber optic network).

The method, receiver, communication system and computer program product according to the various embodiments of the invention provide a low latency solution for detecting loss of data packets in a communication system and recovering data packets with no impact on the transmission latency of the packets going through the main transmission network (such as a RF network for example) for at least two reasons:

no extra information is added to the packet going to the main transmission network (e.g. RF network) at the transmitter side; hence no serialization delay increase.

no queuing occurs at the receiver side as the recovery process is asynchronous.

As the serialization of the backup network is usually very low (typically 10 Gbps which gives 0.8 ns per bytes), it is thus possible to code the FSN on sufficient bits so that it will never rollover, thereby making the invention very robust to packet loss on the backup network.

The invention has a very low memory footprint since the recovery process is asynchronous. This allows the packets received on the main transmission network (e.g. RF network) to be transmitted right away without being queued.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

The methods, systems, and computer program products according to embodiments of the invention allow for identifying missing packets (or lost packets) from at least a main transmission network and recovering asynchronously the missing or lost packets from at least one backup network.

Figure 1:
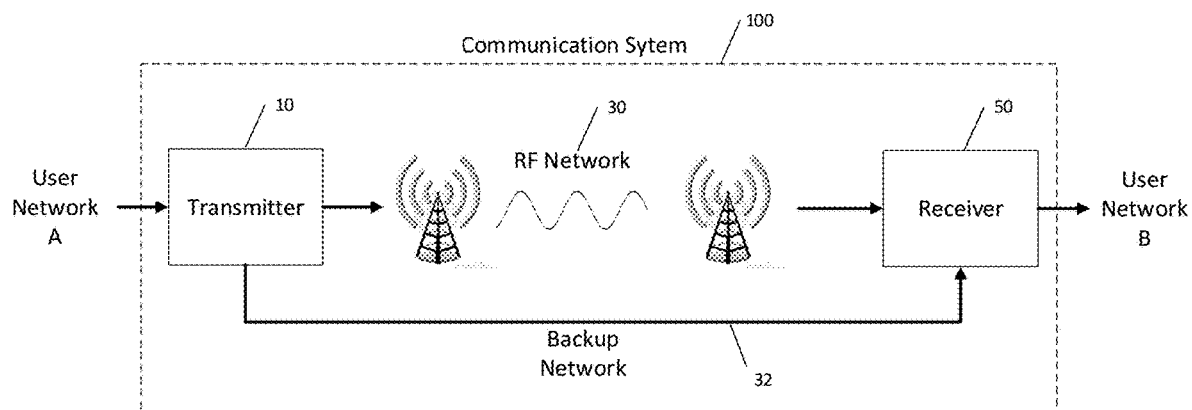
FIG. 1 is a diagrammatic view of an exemplary communication system in which certain embodiments of the invention may be implemented.

Referring to FIG. 1, there is shown an exemplary communication system 100 in which certain embodiments of the invention may be implemented. The communication system 100 may comprise at least one transmitter device 10 (also referred to hereinafter as a "transmitter") configured to transmit data packets to at least one receiver device 50 (also referred to hereinafter as "receiver") through at least one main transmission network 30 forming a transmission channel. The main transmission network may be also referred to hereinafter as "main network" or "main transmission channel". More generally, a transmission network may be also referred to hereinafter as a "transmission channel". Each main transmission network may be any type of network such as Personal Area Network (PAN), Local Area Network (LAN), and Wide Area Network (WAN). Each main transmission channel can be of any type of transmission channel such as a RF wireless, Copper cable or a Fiber optic cable operating at any speed such as for example 100 Mbps, 1 Gbps or 10 Gbps, The data packets may be originated from an origin user device through a user network A and be sent towards a destination user device through a user network B. The user network A and B can be any type of network such as a Personal Area Network (PAN), a Local Area Network (LAN), and a Wide Area Network (WAN). The user network A and B may be of different or similar type and speed.

The receiver 50 is configured to detect loss of a data packet in the main transmission channel 30 based on a hash key signature (also referred to thereinafter as a "hash key" or simply as "hash"), the hash key signature being derived from at least a portion of the received data packet, the receiver being further configured to recover a lost data packet from a backup network 32.

The data packet may comprise a frame check sequence (FCS) used to detect errors introduced during the transmission. For example, the data packet could be an Ethernet packet comprising:

a Media Access Control (MAC) source and destination addresses, an Ethertype, the data payload, and a FCS.

The following description of certain embodiments will be made mainly with reference to a data packet of Ethernet type although the skilled person will readily understand that the invention apply to data packet sent by the transmitter 10 according to any networking protocol.

In certain embodiments, each data packet received through a backup network may further comprise a frame sequence number (FSN), the receiver being further configured to detect loss of a data packet in the backup transmission channel using the frame sequence number.

The transmitters 10 may be equipped with one or more transmit antennas and the receivers 50 may be equipped with one or more receive antennas. The transmission network 10 may be any wired connection, wireless medium or optical fiber-based link. Even if not limited to such applications, the invention has a particular advantage in embodiments where the backup transmission network is slower than the main transmission network.

In one example embodiment, the transmitter 10 of the main transmission network may be a network tap device such as a cross point Layer 1 switch.

In one preferred embodiment of the invention, the main transmission networks 30 may be a Radio Frequency (RF) wireless network 30. The following description of certain embodiments of the invention will be made with reference to a main transmission network 30 represented by an RF wireless network (also referred to as a "RF network") for illustration purpose only.

The communication system 100 further comprises at least one backup transmission network 32 (also referred to hereinafter as "backup network" or "backup transmission channel") configured to recover lost or corrupted packets in order to reduce latency due to retransmission. The backup transmission networks 32 may be any type of network such as a Personal Area Network (PAN), a Local Area Network (LAN), a Wide Area Network (WAN). The backup transmission channels can be of any type such as a RF wireless, copper cable or fiber optic cable operating at any speed such as for example 100 Mbps, 1 Gbps or 10 Gbps.

In certain embodiments, one main transmission network 30 and one main dedicated backup network 32 may be used to allow packet loss recovery for a communication channel between a User Network A and a User Network B through a non-reliable RF wireless network.

Alternatively, at least two main transmission networks 30 may be used while using a single backup network 32. This allows for example packet loss recovery for multiple independent communication channels 30 through non-reliable RF wireless networks 30. In such embodiments, User Networks may be aggregated to the Backup Network 32 using an aggregator, for example based on a round robin algorithm. An identification tag may be associated to each User Networks allowing the Router 61 to route the packets from the Backup Network 32 to the corresponding User Network. In such embodiment, a Router may be used to extract a packet identifier so that it can forward the packet to the corresponding User Network. Each RF receiver 50 implements the loss detection and recovery method per User Network.

In other embodiments at least two main transmission networks and at least two backup networks 32 may be used. Such embodiments allow for example packet loss recovery for a single or multiple independent communication channels 30 through a single or multiple non-reliable RF wireless networks 30. This allows using different type of backup networks 32 with different latencies and reliability. For example one backup network 32 could be a low latency RF network with a low reliability and another backup network 32 could be a fiber network with high latency and high reliability. In such embodiments, packets may be forwarded to all backup networks 32. The packet loss detection and recovery method may be performed to allow recovery from the multiple backup networks 32. If a packet has already been recovered from another backup network 32, the packet may be discarded to prevent duplications.

To facilitate the understand of the certain embodiments of the invention, the following description will be made with reference to a single main network 30 and a single backup network 32, for illustration purpose only.

Figure 2:
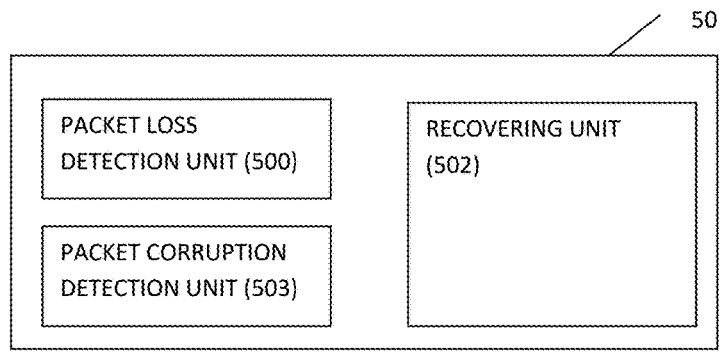
FIG. 2 is a diagrammatic view of a receiver according to some embodiments.

FIG. 2 schematically represents a receiver 50 according to certain embodiments.

In one embodiment of the invention, the receiver 50 may be configured to detect loss of a data packet, the receiver comprising a detection unit 500 for detecting packets lost in a main transmission network 30. The packet loss detection unit 500 may be configured to:

compute a main hash key signature from at least one portion of the received data packet, in response to the reception of a data packet received from a main transmission network 30, compute an auxiliary hash key signature from at least one portion of the received packet data, in response to the reception of a data packet received from a backup transmission network 32.

In certain embodiments, the receiver may further comprise a packet corruption detection unit 503 for detecting if a received data packet is corrupted.

The packet loss detection unit 500 is then configured to detect loss of a data packet using the main hash key signature and the auxiliary hash key signature. In particular, the packet loss detection unit 500 may be configured to compare the main hash key signature and the auxiliary hash key signature to determine if a data packet has been lost in the main transmission network 30. The receiver 50 may further comprise a recovering unit 502 configured to recover a data packet which has been lost in a main transmission network 30 from a backup network 32.

The receiver 50 thereby provides a very low latency recovery mechanism which obviates the need to modify the original packets at the transmission side in an asynchronous way.

Figure 3:
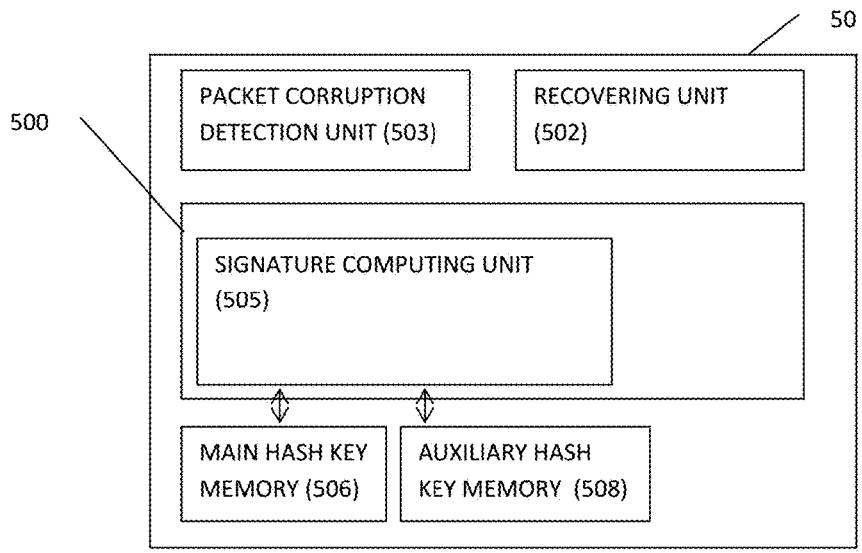
FIG. 3 is a diagrammatic view of a receiver according to alternative embodiments.

FIG. 3 schematically represents a receiver, according to alternative embodiments.

In such embodiments, the receiver 50 may be configured to receive data packet transmitted from a transmitter 10, the data packet being received by the receiver 50 through at least one transmission network among the main transmission network 30 and the backup network 32. Each data packet received through the backup network may comprise a packet Frame Sequence Number (FSN) for detecting data packets lost in the backup network 32. The receiver 50 may comprise a hash key signature computing unit 505 for computing:

for each data packet received from the main transmission network, a hash key signature from the received packet data (hereinafter referred to as a "main hash key"), the receiver comprising a main hash key memory 506 for storing the hash key signature, or each data packet received from the backup transmission network, a hash key signature from the received packet data (hereinafter referred to as a "auxiliary hash key signature"), the receiver 50 comprising a backup hash key memory 508 for storing said hash key into the backup hash key memory together with the FSN associated with the data packet.

The main hash key signature may be generated from at least one portion of the data packet received in the main transmission network. The auxiliary hash key signature may be also generated from at least one portion of the data packet received in the backup transmission network.

The hash key signature computing unit 505 may be part of the packet loss detection unit 500 as shown in FIG. 3.

The main or auxiliary hash key signature may be generated using a hashing algorithm based on at least some of the portions of the data packet.

In a preferred embodiment, the main or auxiliary hash key signature may be generated from fields of the data packet that change among the data packets transmitted at the transmitter side. For example, if the data packet is a data packet according to the Ethernet protocol, comprises a payload which is the same for all packets sent by the transmitter, the hash key signature (main or auxiliary) may be for example determined by a variable field such as a MAC field for example.

The hash key signature may be generated using the Ethernet CRC32 algorithm, or any type of hashing algorithm such as the Message Digest 5 (MD5) algorithm or the Secure Hash Algorithm 1 (SHA-1).

The main and backup hash key memories can be volatile or non-volatile memories such as Flash memories, Dynamic random-access memories (DRAM), Static random-access memories (SRAM). They can be used as content-addressable memory (CAM) or first-in first-out (FIFO).

The hash key signature could be stored in the memories such as each hash key signature is associated to a memory location. They could also be stored in a first-in first-out (FIFO) type of memory.

In the embodiments of FIG. 3, the receiver 50 may also comprise a detection unit 500 for detecting loss of a data packet from the hash key signature stored in said main hash key memory, in response to the presence of at least one hash key signature stored in said backup hash key memory.

In such embodiments, the receiver 50 may further comprise a recovery unit 502 for recovering packet data that have been detected as lost, using the hash key signatures stored in the main and backup hash key memories 505 and 506.

In other embodiments, the receiver 50 may ignore packets that do not require the recovery mechanism. Such packets may be only received from the main transmission network 30. Such packets may be filtered out according to one or more filtering rules, each filtering rule being based on at least some fields comprised in the data packet. For example, the data packet may be filtered by applying a filtering rule based on the Ethernet MAC addresses of the packet. The packet loss detection and packet recovering then only applies to the filtered data packets. In certain embodiments, the received data packets may also comprise a recovering flag having a binary value, the packet loss detection and the recovering method being only applied to the received data packet that comprise a predefined value of the recovering flag.

Figure 4:
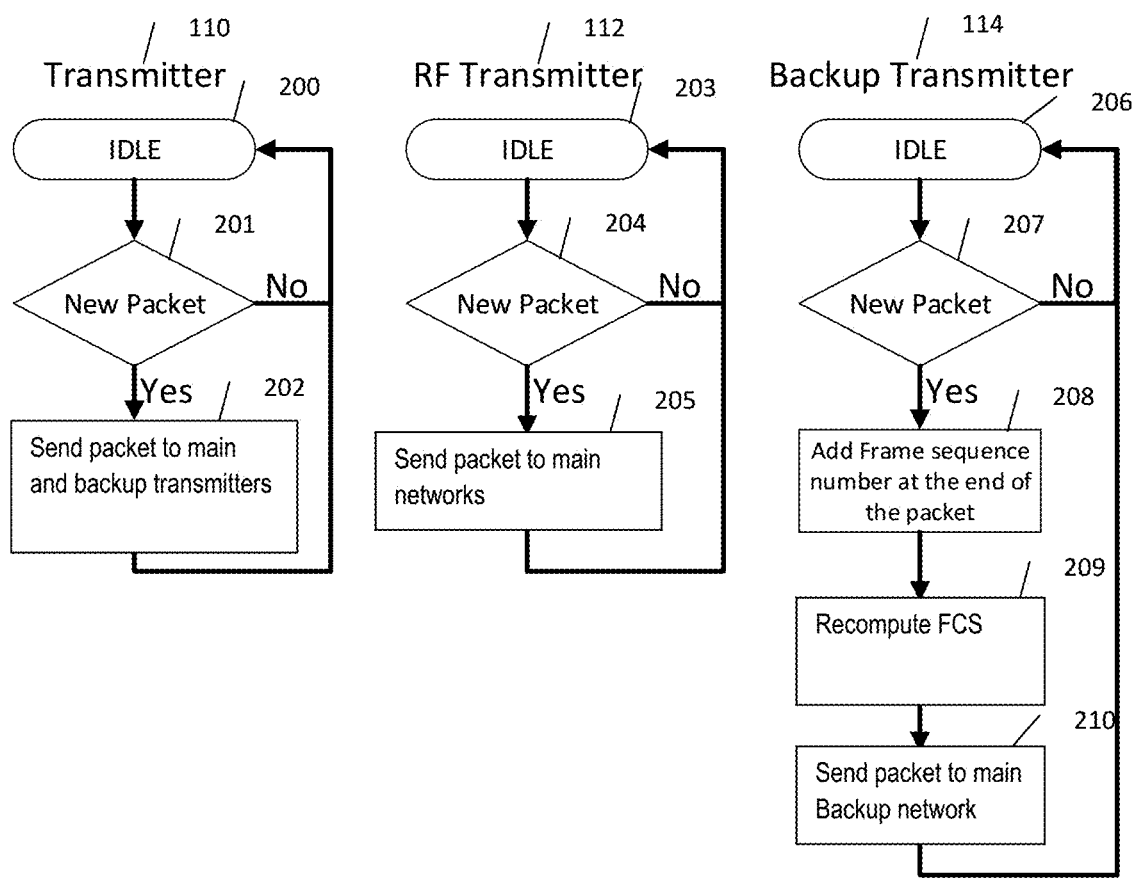
FIG. 4 is a state diagram representing the operation of the transmitter according to certain embodiments.

FIG. 4 is a state diagram representing the operation of the transmitter 10 according to certain embodiments.

The transmitter 10 may be configured to send the User packets 4 to the main and/or the Backup networks 30 and 32. In the following description of FIG. 4, reference will be made to a main network 30 of the type RF for illustration purpose only. The packets 4 going to the RF network 30 may not be modified enabling no transmission penalty. In certain embodiments, a FSN may be added to the packets 4 going to the backup network 32 in order to detect frame loss. The backup network 32 may have a higher latency than the RF network 30 while having a higher bandwidth. In response to the modification of a packet 4 going to the Backup network 32, the FCS must be recomputed.

The operation of the transmitter may be implemented by state machines.

As shown in FIG. 4, in certain embodiments, the operation of the transmitter 10 can be implemented by three state machines, comprising:

a first state machine 110 describing the operation of the transmitter in a first operation mode;

a second state machine 112 describing the operation of the transmitter in a second operation mode or main mode (RF mode in the example of FIG. 4);

a third state machine 114 describing the operation of the transmitter in a third operation mode or Backup mode.

In the first operation mode (main transmitter mode), the first state machine 110 implements the following steps:

In step 201, it is detected if a new packet is received;

In step 202, if a new packet is received, the packet is sent to the main transmitter (RF transmitter for example) to operate according to state machine 112 and to the backup transmitter to operate according to the third state machine 114; otherwise, if no new packet is received, the first state machine 110 returns to an IDLE state (block 200) until a new packet is received.

In the second operation mode (main or RF transmission mode), the second state machine 112 implements the following steps:

In step 204, it is detected if a new packet is received;

In step 205, if a new packet is received, the packet is sent to the RF network 30; otherwise, if no new packet is received, the second state machine 112 returns to an IDLE state (block 203) until a new packet is received.

In the third operation mode (Backup transmission mode), the third state machine 114 implements the following steps:

In step 207, it is detected if a new packet is received;

In step 208, if a new packet is received, a FSN is added at the end of the packet;

In step 209, the FCS is recomputed. The FCS designates an extra error-detecting code that is added to a frame. The FCS may be based on the cyclic redundancy check 32 algorithm (CRC32).

In step 210, the packet is sent to the backup network 32.

If no new packet is detected in step 207, the third state machine 114 returns to an IDLE state (block 206) until a new packet is received.

In some embodiments, the transmitter may only send some packets to the main transmission network. It may be decided not to send the packets to the backup transmission network 32 depending on a transmission condition related to one or more fields contained in the packet. For example, the transmission condition may be related to the Ethernet MAC addresses of the packet.

Figure 5:
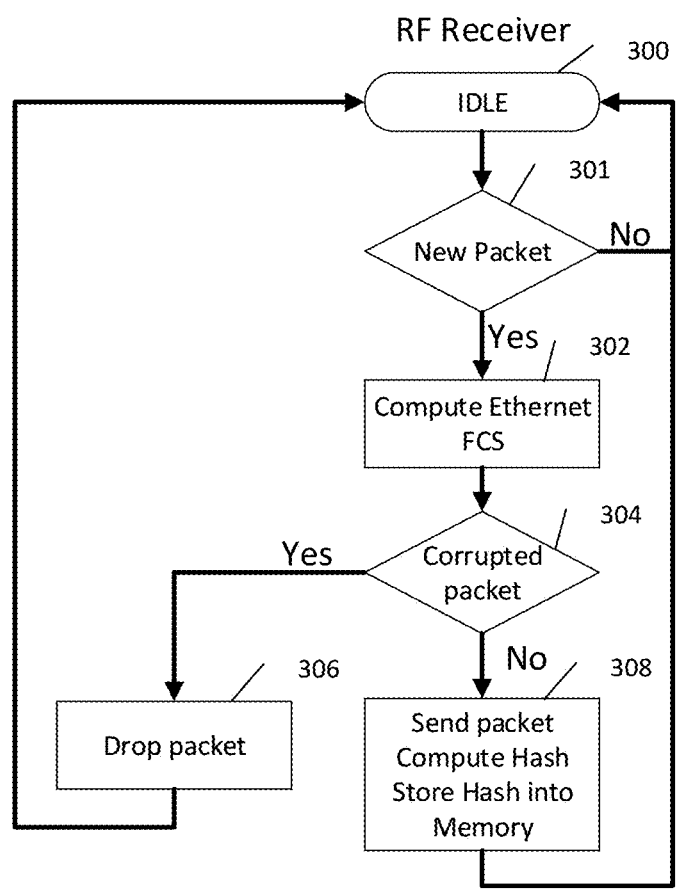
FIG. 5 is a state diagram representing the operation of the receiver, in response to the receipt of a packet from the main transmission network, according to certain embodiments.

FIG. 5 is a state diagram representing the operation of the receiver 50, in response to the receipt of a packet from the RF network 30, according to certain embodiments.

The receiver 50 may be configured to recover lost or corrupted packets on the RF network 30 from the Backup network 32. In particular, the receiver 50 may be configured to detect at least some of the following situations:

Packets are not lost on the RF and on the Backup networks 30 and 32;

Packets are lost on the RF network 30 and no packets are lost on the Backup network 32;

Packets are lost on the Backup network 32, and no packets are lost on the RF network 30

Packets are lost both on RF and Backup networks.

There is provided a packet recovery method for recovering packet lost on the main network 30. The packet recovery method comprises a detection step for detecting when packets are lost on the RF network 30 and not lost on the Backup network 32 using a hash key signature. In certain embodiments, the FSN added to the packet going to the Backup network 32 may be used to detect packet loss on the Backup network 32 so as to ensure a proper synchronization of the recovery process.

In one example embodiment, the packet 4 may be an Ethernet frame according to the 802.3 Standard from the Institute of Electrical and Electronics Engineers (IEEE). The Ethernet frame includes a cyclic redundancy check (CRC) field, which is calculated based on the entire content of the packet 4. In such exemplary embodiment, the hash key signature may be generated using The Ethernet CRC (such as CRC32).

When a packet is received from the RF network 30 at the receiver 50, the FCS may be checked by computing it from the packet data and if the FCS is correct (i.e. the computed FCS is equal to the FCS included in the received data packet), the packet may be forwarded to the destination user device, thereby allowing low latency transmission. In parallel, a hash key signature may be computed from the packet data. Otherwise the packet is detected as corrupted and may be dropped.

More specifically, as described in the embodiment of FIG. 5, the receiver 50 may operate according to the following steps:

In step 301, it is detected if a new packet is received at the receiver 50 from the RF network 30;

In step 302, if a new packet is received, the FCS is computed;

In step 304, it is checked if the packet is corrupted;

In step 306, if the packet is corrupted, the packet may be dropped and not forwarded to the destination user device;

Otherwise, in step 308, if the packet is not corrupted, the packet is sent to the destination user device and a hash key signature is computed. The hash key signature may be stored into a RF hash memory.

If no packet is received, the receiver returns at an IDLE state (block 300).

In step 302, it may be determined if the data packet is corrupted by comparing the FCS field included in the received data packet with the FCS recomputed at the receiver for the received packet. The packet is corrupted if the FCS included in the data packet differs from the recomputed FCS. Otherwise the packet is considered as non-corrupted.

It should be noted that although the invention is not limited to a detection of the corruption based on the FCS field. In alternative embodiments, the corruption of a data packet may be performed by analyzing a portion of the data packet or by using any other suitable technique.

Figure 6:
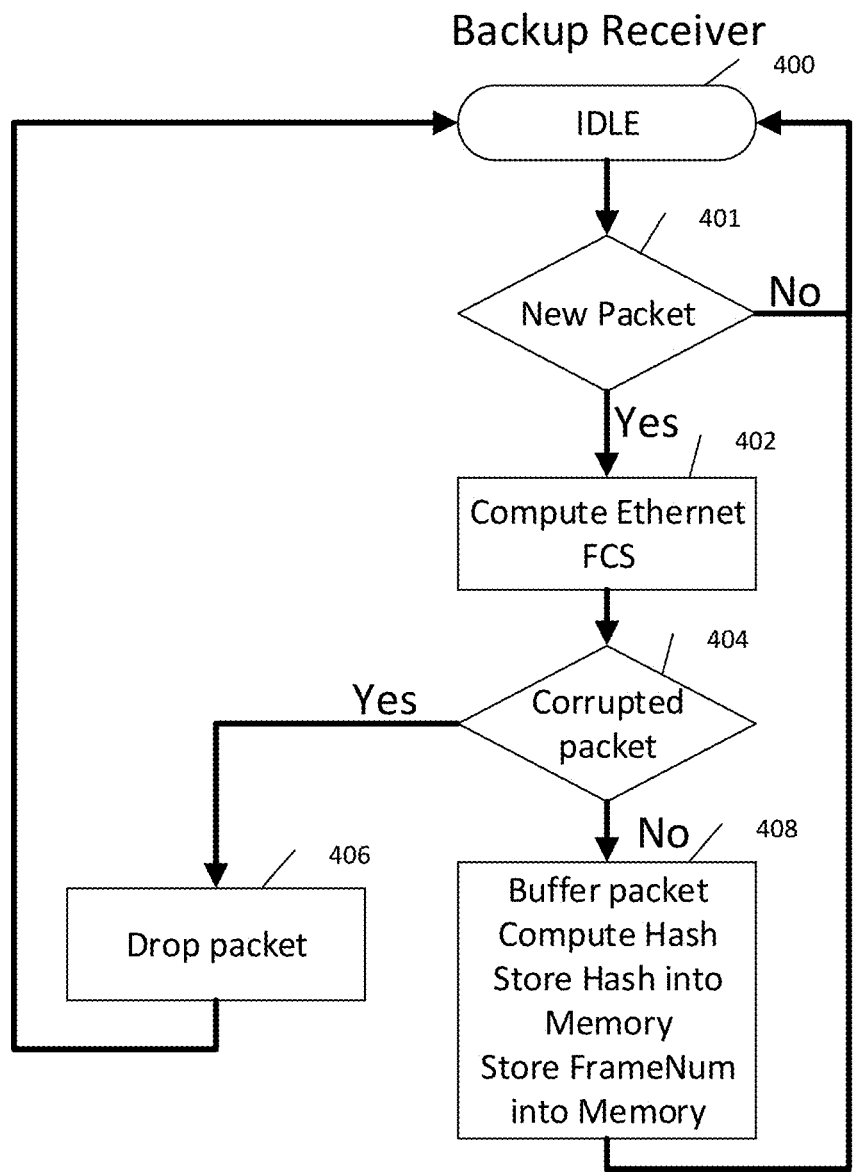
FIG. 6 is a state diagram representing the operation of the receiver, in response to the receipt of a packet from the backup transmission network, according to certain embodiments.

FIG. 6 is a state diagram representing the operation of the receiver 50, in response to the receipt of a packet from the backup network 32, according to certain embodiments.

When a packet is received from the Backup network 32, the FCS may be checked. If the FCS is correct, the packet may be buffered until the recovery method is executed. In parallel, a hash key signature may be computed from the packet data and stored into a memory along with the packet FSN.

More specifically, as described in the embodiment of FIG. 6, the receiver 50 may operate according to the following steps:

In step 401, it is detected if a new packet is received at the receiver 50 from the backup network 32;

In step 402, if a new packet is received, the FCS may be computed;

In step 404, it may be checked if the packet is corrupted;

In step 406, if the packet is corrupted, the packet may be dropped;

Otherwise, if the packet is not corrupted, in step 408, the packet may be buffered and a hash key signature is computed. The hash key signature may be stored into a backup memory. The FSN may be stored into memory also.

If no packet is received, the receiver returns at an IDLE state (block 400).

Figure 7:
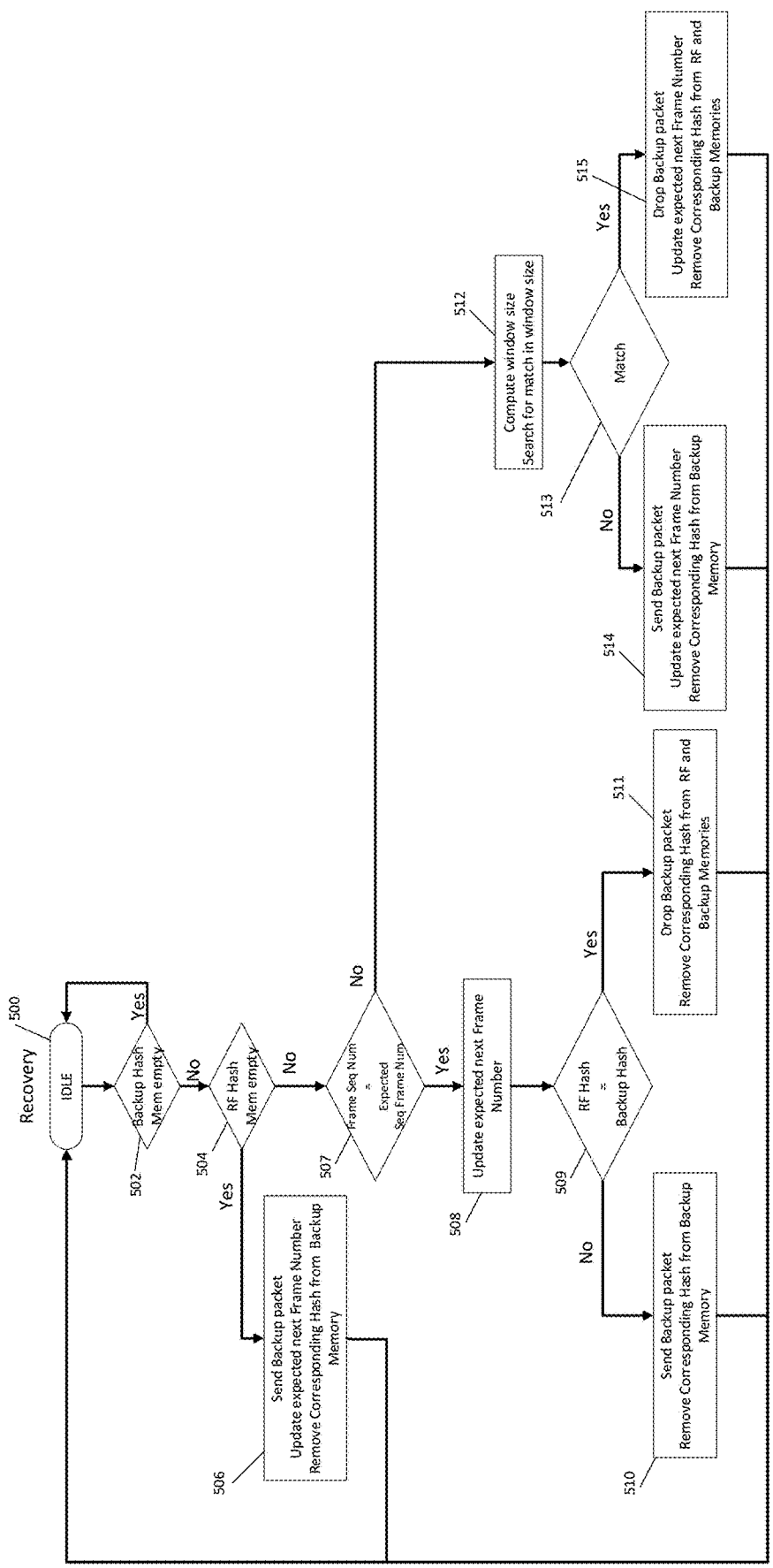
FIG. 7 is a flowchart depicting the recovery method that may be implemented by the receiver, according to certain embodiments.

FIG. 7 is a flowchart depicting the recovery method, according to certain embodiments.

The recovery method may be executed in response to the detection of at least one Hash key in the Backup memory.

In step 502, it is checked if the Backup Hash memory 62 is empty. If so, the method returns to an IDLE state at step 500. Otherwise, if the Backup Hash memory 62 is not empty, it may be further checked if the RF Hash memory 60 is empty, in step 504. If the RF Hash memory is empty, it means that the packet was lost on the RF network 30 since the Backup network 32 is much slower than the RF network 30. Then in step 506, the packet from the Backup network 32 may be forwarded to the destination user device. The expected next FSN may be further updated and the hash key signature entry may be removed from the Backup Memory 62.

If the RF Hash memory is not empty, it may be further checked in step 507 if a gap occurred on the Backup network 32 by comparing the FSN associated with the hash key signature in the backup hash key memory to an expected FSN value (also referred to as a "target" FSN). If the FSN is equal to the expected FSN value, and the hash key signatures are equal then the packet may be dropped (step 511) as it does not need to be recovered. The hash key signatures may be further removed from the RF and Backup memories in step 511. If the hash key signatures are not equal (block 509), the packet may be recovered and the hash key signature may be removed from the Backup memory in step 510.

It should be noted that if it is detected that the FSN is not equal to the expected Frame Number value in step 507 (hence a gap occurred on the Backup network), the method may comprise checking if the recovery method does not go out of synchronization and recovers unnecessary packets by computing a search window in step 512 from the gap size, the search window representing the search area where a matching hash key signature is to be found. If there is no match in the window size (step 513), the packet from the Backup network may be sent in step 514 the hash key signature may be removed from the Backup memory. If there is a match (block 513), the packet may be dropped and the hash key signature removed from the RF and Backup Memories in step 515.

As the number of consecutive packets lost on the Backup network increases, the search window increases and so the time it takes to compare hash key signatures. In some embodiments, a threshold can be added to reduce the search time (the number of hash key signature entries to be matched) in case of huge desynchronization between RF and Backup networks. In such embodiments, the memories may be reset in order to reduce the window search size, achieving a fast relock in the expense of packet loss.

Although certain embodiments of the invention have been described in relation to a single main transmission network 30 and a single backup network 32, the skilled person will readily understand that the invention applies to a communication system using one or more transmission networks 30 and one or more backup network 32, such as communication systems including:

at least two transmission network 30 and one single backup network 32, or at least two transmission network 30 and at least two single backup network 32, or a single transmission network 30 and at least two backup network 32.

Figure 8:
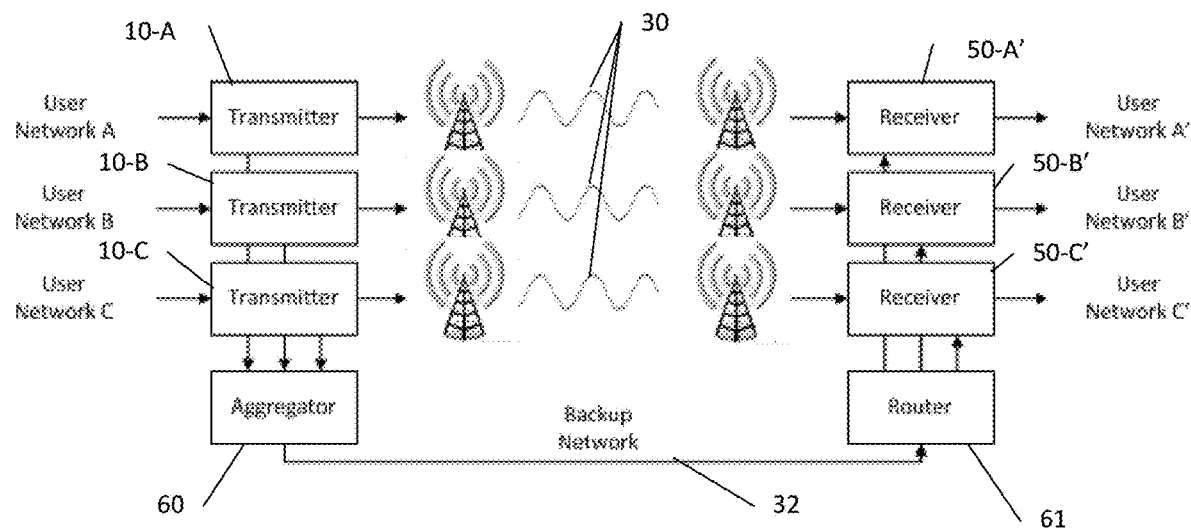
FIG. 8 is a diagrammatic view of an exemplary communication system comprising several main transmission networks and one backup network, according to certain embodiments.

FIG. 8 depicts an exemplary embodiment of the invention in which a single backup network 32 is used to allow packet loss recovery for multiple independent communication channels through at least two main transmission networks 30 such as non-reliable RF wireless networks (in FIG. 8 three main transmission networks are used).

In such embodiment, each user network A, B or C is associated with a transmitter denoted respectively 10-A, 10-B and 10-C. Further, each user network A', B' or C' is associated with a receiver denoted respectively 50-A', 50-B' and 50-C'. Each receiver may implement the recovery method according to certain embodiments. In such configuration of the communication system, the communication system may comprise an aggregator 60 at the transmission side configured to aggregate the data packets from the multiple user networks A, B and C to a single backup network 32. In certain embodiments, an identification tag may be associated with each user networks A, B and C at the transmitter side. The identification tag may be added to the data packet at the transmission side. The communication system may further comprises a router 61 configured to use the identification tag included in each data packet received from the backup network to route the data packets from the Backup network 32 to the corresponding user network receiver 50-A', 50-B' and 50-C'.

In one exemplary embodiment, the aggregator 60 and the router 61 may be a Layer 2 switch. In such exemplary embodiment, the data packets comply with the Ethernet protocol and the identification tag added to the data packet may be a VLAN tag (IEEE 802.3q standard).

Figure 9:
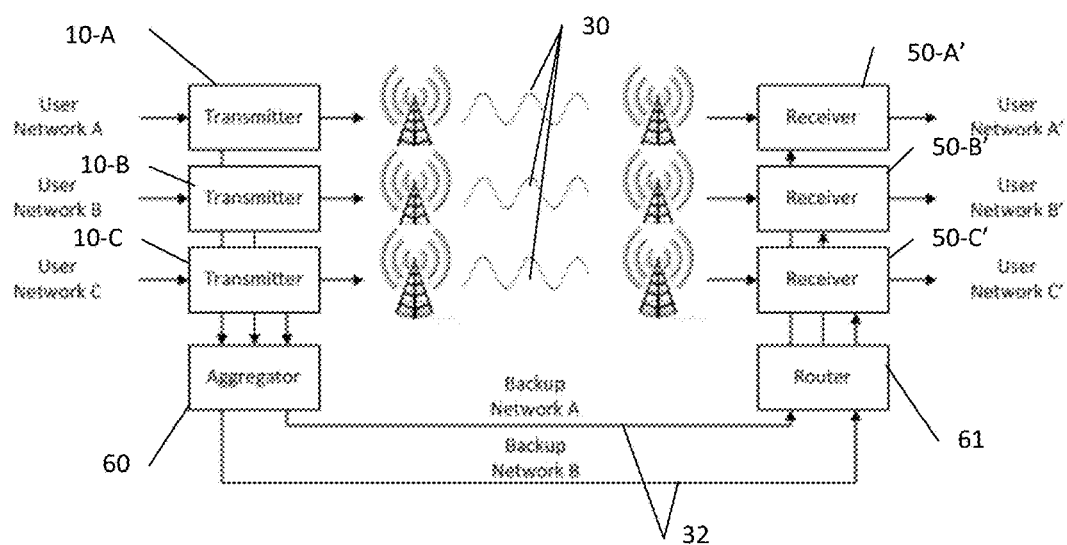
FIG. 9 is a diagrammatic view of an exemplary communication system comprising several main transmission networks and several backup networks, according to certain embodiments.

FIG. 9 depicts an exemplary embodiment of the invention in which multiple backup networks 32 are used to allow packet loss recovery for multiple independent communication channels through at least one main transmission networks 30 such as non-reliable RF wireless networks (in FIG. 8 three main transmission networks 30 and two backup networks 32 are used).

The multiple backup networks 32 are used to allow packet loss recovery for a single or multiple independent communication channels through a single or multiple main transmission channel 30 (such as for example non-reliable RF wireless networks). This allows using different type of backup networks with different latencies and reliability. For example one backup network 32 could be a low latency RF network (in such embodiments, the latency remains higher than the RF latency) with a low reliability and another backup network 32 could be a fiber network with high latency and high reliability.

The architecture of the system 100 is similar to the architecture of FIG. 8. The communication system may comprise a transmitter 10-A, 10-B-10-C and a receiver 50-A', 50-B', 50-C' per user networks, an aggregator 60 and a router 61 for the backup networks. However, in such embodiments, the receiver recovery mechanism is adapted to the multiple backup networks 32. More specifically, if a data packet has already been recovered from a backup network 32, the data packet may be discarded from all other backup networks to prevent duplications. If a data packet has already been recovered, the data packet may be dropped and the corresponding hash key signature removed from the backup memory. It should be noted that the recovery method is implemented for each backup network.

Embodiments of the invention thus enable a very low latency recovery of data packets which does not require modifying the original packets going to the main network, while being asynchronous. Accordingly it does not depend on a particular format of the data packet received at the receiver 50 and obviate the need for complex modification of the data packet at the transmission side. In certain embodiments, the robustness of the recovery method may be still increased by a joint use of a FSN and a hash key signature. The embodiments of the invention allows having any combination of main transmission networks 30 and Backup Networks 32, using one or multiple main transmission networks and one or multiple Backup networks.

Embodiments of the invention may be applied to the communication of financial market data and the execution of market trades with reduced levels of network latency between transmitters and receivers. In particular, it may be applied to any type of communication channel where reliability is required.

Financial market data network can include any number of separate financial exchanges (NYSE, NASDAQ, CME, etc.) that each communicate with a number of communication switches for relaying financial market data to other downstream components and consumers (not shown).

However, the invention is not limited to an application of the invention to financial market data network architectures. It will be understood that the various inventive principles and embodiments disclosed herein can be applied to other data network architectures, arrangements and communications as well.

Embodiments of the present inventions thus provide a very low latency recovery process by not modifying the original packets going to the RF network and by being asynchronous. Moreover, they achieve a very robust recovery by using a combination of FSN and hash key signature.

The methods and devices described herein may be implemented by various means. For example, these techniques may be implemented in hardware, software, or a combination thereof. The processing elements of a transmitter 10 and the receiver 50 can be implemented for example according to a hardware-only configuration (for example, in one or more FPGA, ASIC or VLSI integrated circuits with the corresponding memory) or according to a configuration using both VLSI and DSP.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The program code embodying any of the embodiments of the invention described herein is capable of being individually or collectively distributed as a program product in a variety of different forms. In particular, the program code may be distributed using computer-readable media, which may include computer-readable storage media and communication media. Computer-readable storage media, which are inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer-readable instructions, data structures, or other program modules. By way of example, and not limitation, communication media may include wired media such as a wired network or direct-wired connection, and wireless media such as acoustic, RF, infrared and other wireless media. Combinations of any of the above may also be included within the scope of computer-readable media.

In addition, program code described herein may be identified based upon the application or software component within which the program code is implemented in a specific embodiment of the invention. However, it should be appreciated that any particular program nomenclature that follows is used merely for convenience, and thus the invention should not be limited to use solely in any specific application identified and/or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept. In particular, the invention is not limited to a particular type of main and backup network. Further the invention is not limited to particular techniques for generating hash key signatures from the data packets. While certain embodiments have been described with reference to separate main and backup hash key memories, in some embodiment a common storage unit may be used to store the main and backup hash key signature using distinct data structures.

The invention claimed is:

1. A method of receiving a data packet comprising one or more fields at a receiver in a communication system, the communication system comprising at least one main network, having limited bandwidth, and at least one backup network, the data packet being transmitted asynchronously to the receiver from a transmitter provided in the communication system over at least one main network, with no additional data being added to the packet, and over at least one backup network to the receiver, wherein the method comprises:
   for each data packet received from a main network, computing a main hash key signature at the receiver from one or more fields of the data packet,
   for each data packet received from a backup network, computing an auxiliary hash key signature at the receiver from one or more fields of the data packet,
   detecting loss of a data packet from the main network based on a comparison between the main hash key signature and the auxiliary hash key signature, and recovering the lost data packet from the backup network,
   wherein the computation of the main and auxiliary hash key signatures for the data packet received over the main network and the backup network is performed asynchronously,
   wherein said step of detecting loss of a data packet comprises:
   storing the main hash key signature computed for each data packet received from the main network into a main hash key memory,
   storing the auxiliary hash key signature computed for each data packet received from the backup network into a backup hash key memory together with a frame sequence number associated with the data packet,
   the method further comprising detecting loss of a data packet from the main hash key signature stored in said main hash key memory, in response to the presence of at least one auxiliary hash key signature stored in said backup hash key memory.

2. The method of claim 1, wherein each data packet received through said at least one backup network comprises a frame sequence number, and the method further comprises detecting loss of a data packet from the backup network using said frame sequence number.

3. The method of claim 1, wherein each data packet received through said at least one main network and at least one backup network comprises a frame check sequence field wherein the method further comprises forwarding error free user data packets from the main network or the backup network to a destination user device using said frame check sequence field.

4. The method of claim 1, wherein the main and auxiliary hash key signatures are derived from one or more fields of the data packet that vary among the data packets.

5. The method of claim 1, wherein the data packet is a data packet according to an Ethernet protocol, and the main and auxiliary hash key signatures are derived from at least one field chosen in a group consisting of an Ethernet MAC address field, an Ethernet Ethertype field, the data payload and an Ethernet CRC field.

6. The method of claim 1, wherein the main and auxiliary hash key signatures are determined using at least one hashing algorithm chosen in a group consisting of a Message Digest 5 (MD5) algorithm and the Secure Hash Algorithm 1 (SHA-1).

7. The method of claim 1, wherein the method comprises determining if a received data packet is corrupted, said step of detecting loss of a data packet being performed if it is determined that the data packet is not corrupted.

8. The method of claim 7, wherein the method comprises buffering the data packet if the data packet is not corrupted.

9. The method of claim 7, wherein the method comprises dropping the data packet if the data packet is corrupted.

10. The method of claim 7, wherein each data packet received at the receiver comprises a Frame Check Sequence (FCS) field and said step of determining if the received data packet is corrupted comprises computing the FCS of the received data packet and comparing the computed FCS with the FCS included in the FCS field of the data packet.

11. The method of claim 1, wherein the method comprises filtering the received data packets according to filtering rules that depend on at least one field of the data packets, said step of detecting loss of a data packet only applying to the filtered data packets.

12. The method of claim 1, wherein the data packets received from the backup network are buffered, and wherein said step of detecting loss of a given data packet comprises determining if the main hash key memory is empty, and if so forwarding the data packet corresponding to a target packet frame sequence number to a destination user device and updating the target packet frame sequence number.

13. The method of claim 12, wherein the method comprises comparing the packet frame sequence number stored in association with the auxiliary hash key signature in the backup hash key memory with the target packet frame sequence number, and if so updating the target packet frame sequence number.

14. The method of claim 1, wherein the method comprises further dropping the data packet if the auxiliary hash key signature in the backup hash key memory is equal to the main hash key signature in the main hash key memory.

15. The method of claim 1, wherein the method comprises sending the data packet to a destination user device if the auxiliary hash key signature in the backup hash key memory differs from the main hash key signature in the main hash key memory.

16. The method of claim 1, wherein the communication system comprises one main network and at least two backup networks.

17. The method of claim 1, wherein the communication system comprises at least two main networks and one backup network.

18. The method of claim 1, wherein the communication system comprises one main network and one backup network.

19. The method of claim 1, wherein the communication system comprises at least two main networks and at least two backup networks.

20. A receiver for receiving a data packet comprising one or more fields at a communication system, the communication system comprising at least one main network and at least one backup network, the data packet being transmitted asynchronously to the receiver from a transmitter provided in the communication system over at least one main network with no additional data being added to the packet, and over at least one backup network to the receiver, wherein the receiver is configured to:
for each data packet received from a main network, compute a main hash key signature at the receiver from one or more fields of the data packet, and
for each data packet received from a backup network, compute an auxiliary hash key signature at the receiver from one or more fields of the data packet,
the receiver comprising a loss detection unit for detecting loss of a data packet from the main network based on a comparison between the main hash key signature and the auxiliary hash key signature and for recovering the lost data packet from the backup network, wherein the computation of the main and auxiliary hash key signatures for the data packet received over the main network and the backup network is performed asynchronously,
wherein said loss detection unit is configured to:
store the main hash key signature computed for each data packet received from the main network into a main hash key memory,
store the auxiliary hash key signature computed for each data packet received from the backup network into a backup hash key memory together with a frame sequence number associated with the data packet,
the loss detection unit being configured to detect loss of a data packet from the main hash key signature stored in said main hash key memory, in response to the presence of at least one auxiliary hash key signature stored in said backup hash key memory.

21. The receiver of claim 20, wherein each data packet received through the backup network comprises a frame sequence number, the loss detection unit being further configured to detect loss of a data packet from the backup network using said frame sequence number.

22. The receiver of claim 20, wherein each data packet received through said at least one main network and at least one backup network comprises a frame check sequence field, and wherein the receiver is configured to forward error free user data packets from the main network or the backup network to a destination user device using said frame check sequence field.

23. The receiver of claim 20, wherein the main and auxiliary hash key signatures are derived from one or more fields of the data packet that vary among the data packets.

24. The receiver of claim 20, wherein the data packet is a data packet according to an Ethernet protocol, and the main and auxiliary hash key signatures are derived from at least one field chosen in a group consisting of an Ethernet MAC address field, an Ethernet Ethertype field, the data payload and an Ethernet CRC field.

25. The receiver of claim 20, wherein the main and auxiliary hash key signatures are determined using at least one hashing algorithm chosen in a group consisting of a Message Digest 5 (MD5) algorithm and the Secure Hash Algorithm 1 (SHA-1).

26. The receiver of claim 20, wherein the loss detection unit is previously configured to determine if the received data packet is corrupted, the loss detection unit being configured to detect the loss of a data packet if is determined that the data packet is not corrupted.

27. The receiver of claim 26, wherein the receiver is configured to buffer the data packet if the data packet is not corrupted.

28. The receiver of claim 26, wherein the receiver is configured to drop the data packet if the data packet is corrupted.

29. The receiver of claim 26, wherein each data packet received at the receiver comprises a Frame Check Sequence (FCS) field and the receiver is configured to determine if a received data packet is corrupted by computing the FCS of the received data packet and comparing the computed FCS with the FCS included in the FCS field of the data packet.

30. The receiver of claim 20, wherein the receiver is configured to filter the received data packets according to filtering rules that depend on at least one field of the data packets, the loss detection unit being configured to only process the filtered data packets.

31. The receiver of claim 20, wherein the data packets received from the backup network are buffered, and wherein the loss detection unit is configured to determine if the main hash key memory is empty, and if so forward the data packet corresponding to a target packet frame sequence number to a destination user device and update the target packet frame sequence number.

32. The receiver of claim 31, wherein the receiver is configured to compare the packet frame sequence number stored in association with the auxiliary hash key signature in the backup hash key memory with the target packet frame sequence number, and if so to update the target packet frame sequence number.

33. The receiver of claim 20, wherein the receiver is further configured to drop the data packet if the auxiliary hash key signature in the backup hash key memory is equal to the main hash key signature in the main hash key memory.

34. The receiver of claim 20, wherein the receiver is configured to send the data packet to a destination user device if the auxiliary hash key signature in the backup hash key memory differs from the main hash key signature in the main hash key memory.

35. The receiver of claim 20, wherein the communication system comprises one main network and at least two backup networks.

36. The receiver of claim 20, wherein the communication system comprises at least two main networks and one backup network.

37. The receiver of claim 20, wherein the communication system comprises one main network and one backup network.

38. The receiver of claim 20, wherein the communication system comprises at least two main networks and at least two backup networks.

39. A communication system comprising at least one main network, having limited bandwidth, and/or at least one backup network, and a transmitter configured to asynchronously transmit a data packet comprising one or more fields over at least one main network with no additional data being added to the packet and over at least one backup network, the communication system further comprising at least one receiver for receiving data packets from the transmitter, the receiver being configured to recover lost packets from the backup network and forward said data packets to at least one destination user device, wherein the receiver is configured to:
- for each data packet received from the main network, compute a main hash key signature from one or more fields of the data packet received over the main network, and
- for each data packet received from the backup network, compute an auxiliary hash key signature from one or more fields of the data packet received over the backup network,
- the receiver comprising a loss detection unit for detecting loss of a data packet from a main network based on a comparison between the main hash key signature and the auxiliary hash key signature, and recover the lost data packet from the backup network,
- wherein the computation of the main and auxiliary hash key signatures for the data packet received over the main network and the backup network is performed asynchronously,
- wherein said loss detection unit is configured to:
- store the main hash key signature computed for each data packet received from the main network into a main hash key memory,
- store the auxiliary hash key signature computed for each data packet received from the backup network into a backup hash key memory together with a frame sequence number associated with the data packet,
- the loss detection unit being configured to detect loss of a data packet from the main hash key signature stored in said main hash key memory, in response to the presence of at least one auxiliary hash key signature stored in said backup hash key memory.

40. A computer program product for receiving a data packet at a receiver in a communication system, the communication system comprising at least one main network, having limited bandwidth, and at least one backup network, the data packet comprising one or more fields being asynchronously transmitted over the at least one main network with no additional data being added to the packet and over the at least one backup network, the computer program product comprising:
- a non-transitory computer-readable storage medium; and
- program code stored on the non-transitory computer-readable storage medium that, when executed by one or more processors, causes the one or more processors to recover lost packets from a backup network and forward said data packets to at least one destination user device, the one or more processors being further configured to:
- for each data packet received from a main network, compute a main hash key signature from one or more fields of the data packet received over the main network, and
- for each data packet received from the backup network, compute an auxiliary hash key signature from one or more fields of the data packet received over the backup network,
- the one or more processors being configured to detect loss of a data packet from the main network based on a comparison between the main hash key signature and the auxiliary hash key signature, and recover the lost data packet from the backup network, the computation of the main and auxiliary hash key signatures for the data packet received over the main network and the backup network being performed asynchronously,
- wherein the detection of loss of a data packet comprises:
- storing the main hash key signature computed for each data packet received from the main network into a main hash key memory,
- storing the auxiliary hash key signature computed for each data packet received from the backup network into a backup hash key memory together with a frame sequence number associated with the data packet,
- the one or more processors being further caused to detect loss of a data packet from the main hash key signature stored in said main hash key memory, in response to the presence of at least one auxiliary hash key signature stored in said backup hash key memory.

* * * * *